United States Patent
Sato et al.

(10) Patent No.: US 9,112,201 B2
(45) Date of Patent: Aug. 18, 2015

(54) HYDROGEN PRODUCTION APPARATUS, FUEL CELL SYSTEM AND OPERATION METHOD THEREOF

(75) Inventors: Yasushi Sato, Kanagawa (JP); Akira Goto, Kanagawa (JP); Ken Samura, Kanagawa (JP); Akira Fuju, Osaka (JP); Masataka Kadowaki, Osaka (JP)

(73) Assignee: JX NIPPON OIL & ENERGY CORPORATION (JP)

( * ) Notice: Subject to any disclaimer, the term of this patent is extended or adjusted under 35 U.S.C. 154(b) by 1202 days.

(21) Appl. No.: 12/281,425

(22) PCT Filed: Feb. 26, 2007

(86) PCT No.: PCT/JP2007/053530
§ 371 (c)(1),
(2), (4) Date: Sep. 2, 2008

(87) PCT Pub. No.: WO2007/099911
PCT Pub. Date: Sep. 7, 2007

(65) Prior Publication Data
US 2009/0011298 A1    Jan. 8, 2009

(30) Foreign Application Priority Data

Mar. 2, 2006 (JP) .................................. 2006-056455

(51) Int. Cl.
*H01M 8/06* (2006.01)
*C01B 3/38* (2006.01)
(Continued)

(52) U.S. Cl.
CPC ............... *H01M 8/0631* (2013.01); *C01B 3/38* (2013.01); *C01B 3/386* (2013.01); *C01B 3/48* (2013.01);
(Continued)

(58) Field of Classification Search
None
See application file for complete search history.

(56) References Cited

U.S. PATENT DOCUMENTS

| 4,985,074 A | 1/1991 | Okada et al. |
| 5,464,606 A * | 11/1995 | Buswell et al. ............ 423/655 |

(Continued)

FOREIGN PATENT DOCUMENTS

| JP | 2654515 B | 5/1997 |
| JP | 2688749 B | 8/1997 |

(Continued)

OTHER PUBLICATIONS

Notification of Transmittal of Translation of the International Preliminary Report on Patentability (Chapter I of Chapter II of the Patent Cooperation Treaty) for International Application No. PCT/JP2007/053530; Date of mailing Sep. 16, 2008 with English translation; Form PCT/IB/338.

(Continued)

*Primary Examiner* — Alix Eggerding
(74) *Attorney, Agent, or Firm* — Cantor Colburn LLP

(57) ABSTRACT

There are provided a hydrogen production apparatus, a fuel cell system and operation method thereof, which can more reliably suppress degradation due to oxidation of a catalyst in a hydrogen production apparatus even when start-ups and shutdowns are repeated without a purge operation during the shutdowns. The hydrogen production apparatus includes a reforming part, a shift reaction part, and a selective oxidation reaction part having a selective oxidation catalyst bed packed with a selective oxidation catalyst, wherein the hydrogen production apparatus has an oxygen absorbent bed packed with an oxygen absorbent capable of absorbing oxygen and capable of being regenerated by a reducing gas, and the oxygen absorbent bed and the selective oxidation catalyst bed are stacked with the oxygen absorbent bed on the downstream side, and the hydrogen production apparatus has means for opening the downstream of the oxygen absorbent bed to the atmosphere. The fuel cell system has this hydrogen production apparatus. The operation method of this fuel cell system includes opening the downstream of the oxygen absorbent bed to the atmosphere upon shutdown of the fuel cell system, and regenerating the oxygen absorbent using a hydrogen-containing gas during hydrogen production by the hydrogen production apparatus.

12 Claims, 4 Drawing Sheets

(51) Int. Cl.
   *C01B 3/48* (2006.01)
   *C01B 13/02* (2006.01)
   *H01M 8/04* (2006.01)

(52) U.S. Cl.
   CPC ....... *C01B 13/0262* (2013.01); *H01M 8/04223* (2013.01); *H01M 8/0618* (2013.01); *H01M 8/0668* (2013.01); *C01B 2203/0233* (2013.01); *C01B 2203/0261* (2013.01); *C01B 2203/0283* (2013.01); *C01B 2203/044* (2013.01); *C01B 2203/047* (2013.01); *C01B 2203/066* (2013.01); *C01B 2203/1047* (2013.01); *C01B 2203/1076* (2013.01); *C01B 2203/127* (2013.01); *C01B 2203/1604* (2013.01); *C01B 2203/1609* (2013.01); *C01B 2210/0046* (2013.01); *H01M 8/0662* (2013.01); *Y02B 90/14* (2013.01); *Y02E 60/50* (2013.01)

(56) References Cited

U.S. PATENT DOCUMENTS

| | | | | |
|---|---|---|---|---|
| 5,658,681 | A | * | 8/1997 | Sato et al. ............ 429/412 |
| 6,171,572 | B1 | * | 1/2001 | Aozasa ............ 423/594.12 |
| 2003/0087138 | A1 | * | 5/2003 | Margiott et al. ............ 429/17 |
| 2004/0067395 | A1 | | 4/2004 | Nakata et al. |
| 2004/0241509 | A1 | * | 12/2004 | Taguchi et al. ............ 429/19 |
| 2005/0112423 | A1 | * | 5/2005 | Omoto et al. ............ 429/20 |
| 2006/0165588 | A1 | | 7/2006 | Crewdson | |

FOREIGN PATENT DOCUMENTS

| | | |
|---|---|---|
| JP | 11191426 A | 7/1999 |
| JP | 2002280038 A | 9/2002 |
| JP | 2003327408 A | 11/2003 |
| JP | 2005179081 A | 7/2005 |
| JP | 2005534602 | 11/2005 |

OTHER PUBLICATIONS

International Preliminary Report on Patentability for International Application No. PCT/JP2007/053530; Date of issuance of report Sep. 2, 2008; with English translation; Form PCT/IB/373.

Written Opinion of The International Searching Authority for International Application No. PCT/JP2007/053530; Filed Feb. 26, 2007; with English translation; Form PCT/ISA/237.

International Search Report for International Application No. PCT/JP2007/053530; Date of mailing May 1, 2007; English translation.

Notification Concerning Submission or Transmittal of Priority Document for International Application No. PCT/JP2007/053530; Date of mailing May 8, 2007 with English translation.

Second and Supplementary Notice for International Application No. PCT/JP2007/053530; Date of mailing Jul. 3, 2008 with English translation.

Notification of the Recording of a Change for International Application No. PCT/JP2007/053530; Date of mailing Jul. 24, 2008 with English translation.

* cited by examiner (a)

(b)

(a)

(b)

(a)

(b)

HYDROGEN PRODUCTION APPARATUS, FUEL CELL SYSTEM AND OPERATION METHOD THEREOF

CROSS REFERENCE TO RELATED APPLICATIONS

This is a U.S. national stage of application No. PCT/JP2007/053530, filed on 26 Feb. 2007. Priority under 35 U.S.C. §119(a) and 35 U.S.C. §365(b) is claimed from Japanese Application No. 2006-056455, filed Mar. 2, 2006, the disclosure of which is also incorporated herein by reference.

TECHNICAL FIELD

The present invention relates to a hydrogen production apparatus for producing hydrogen from a raw material for hydrogen production such as city gas, liquefied petroleum gas (LPG), kerosene and the like, and a fuel cell system which uses a hydrogen-containing gas produced by this hydrogen production apparatus as fuel.

BACKGROUND ART

The development of fuel cells is intensifying, since it is said that fuel cells are a power generation system having good energy utilization efficiency. Among fuel cells, polymer electrolyte fuel cells are especially drawing attention due to their high power density and ease of handling.

For a fuel cell, which generates power through an electrochemical reaction between hydrogen and oxygen, it is essential to establish hydrogen supply means. One method for doing this is to produce hydrogen by reforming a raw material for hydrogen production such as a hydrocarbon fuel. From the viewpoint that supply systems of hydrocarbon fuels are already socially established, this method is more advantageous than methods in which pure hydrogen is used.

Examples of hydrocarbon fuels include city gas, LPG, gasoline, kerosene, light oil and the like. Since liquid fuels such as LPG, gasoline, kerosene and light oil are easily handled, stored and transported, and are inexpensive, these fuels are gaining attention as fuels for fuel cells. In order to use these raw materials for hydrogen production in fuel cells, hydrogen must be produced from the hydrocarbon. For this purpose, a hydrogen production apparatus equipped with at least a reformer is used.

In a hydrogen production apparatus, for example, a hydrocarbon is reacted with water in a reformer to decompose into mainly carbon monoxide and hydrogen. Then, a large portion of the carbon monoxide is reacted with water in a shift reactor to convert into hydrogen and carbon dioxide. Finally, the small remaining amount of carbon monoxide is reacted with oxygen in a selective oxidation reactor to turn into carbon dioxide. Further, since sulfur may be a poisoning substance for reforming catalysts or the like, in many cases a desulfurizer is provided for removing the sulfur in the hydrocarbon fuel.

When stopping such a fuel cell system, for the purpose of protecting the catalyst present in the hydrogen production apparatus and the like, purging with an inert gas, typically nitrogen, has been carried out. However, space is required to store nitrogen, and it takes time and effort to supply and manage nitrogen.

In order to break through such a situation, Patent Document 1 discloses a fuel cell power generation system which utilizes regenerable oxygen removal means for removing oxygen contained in air. Patent Document 1 is directed to providing purge means of a fuel cell power generation system where the means can easily supply an inert gas to be used for the purging of a fuel cell system and the means needs no component replacement and the like and is good in maintenance aspect.

In the art of Patent Document 1, although an inert gas cylinder or the like is unnecessary, air is fed to a deoxydizing column (oxygen removing means) from an air supply blower to reduce the oxygen concentration, and the purging is carried out using this oxygen-reduced gas. That is, purging is still carried out, and the shutdown operation cannot be said to be simple. Further, operation of the air supply blower needs to be continued even after finishing power generation, and thus the energy used for this purpose is wasted.

Patent Document 2 discloses an art which enables suppressing oxidation degradation of the catalyst in a hydrogen production apparatus with no purge operation upon shutting down the hydrogen production apparatus or a fuel cell system provided with the hydrogen production apparatus.

Patent Document 1: Japanese Patent Laid-Open No. 2002-280038
Patent Document 2: Japanese Patent Laid-Open No. 2005-179081

DISCLOSURE OF THE INVENTION

Problems to be Solved by the Invention

However, in a hydrogen production apparatus which includes a reformer, a shift reactor and a selective oxidation reactor, even with the technique disclosed in Patent Document 2, in some cases there is a tendency for the shift reaction catalyst and selective oxidation catalyst to degrade due to oxidation upon shutting down the apparatus. It has been found that further improvements are desired in view of longer life, particularly when start-up and shutdown operations are repeated.

It is an object of the present invention to provide a hydrogen production apparatus which can more reliably suppress catalyst degradation due to oxidation in the hydrogen production apparatus even when start-ups and shutdowns are repeated without carrying out a purge operation upon shutting down the hydrogen production apparatus.

It is another object of the present invention to provide a fuel cell system and an operation method thereof which can more reliably suppress catalyst degradation due to oxidation in the hydrogen production apparatus even when start-ups and shutdowns are repeated without carrying out a purge operation upon shutting down the fuel cell system.

Means for Solving the Problems

According to the present invention, provided is a hydrogen production apparatus including a reforming part for obtaining a hydrogen-containing gas by utilizing a reforming reaction from a raw material for hydrogen production, a shift reaction part for reducing the concentration of carbon monoxide in the outlet gas of the reforming part by shift reaction, and a selective oxidation reaction part having a selective oxidation catalyst bed packed with a selective oxidation catalyst which selectively oxidizes carbon monoxide for further reducing the concentration of carbon monoxide in the outlet gas of the shift reaction part, wherein the hydrogen production apparatus includes an oxygen absorbent bed packed with an oxygen absorbent capable of absorbing oxygen and capable of being regenerated by a reducing gas, and the oxygen absorbent bed and the selective oxidation catalyst bed are stacked with the oxygen absorbent bed on the downstream side, and the hydrogen production apparatus includes means for opening the downstream of the oxygen absorbent bed to the atmosphere.

The oxygen absorbent may contain at least one metal selected from the group consisting of Ru, Pt, Au, Ni, Co, Rh, Pd, Ir, Ag and Re.

The oxygen absorbent may contain at least one oxide selected from ceria, zirconia, titania, yttria, manganese oxide, tin oxide, iron oxide, copper oxide, and zinc oxide.

According to the present invention, provided is a fuel cell system including a hydrogen production apparatus having a reforming part for obtaining a hydrogen-containing gas by utilizing a reforming reaction from a raw material for hydrogen production, a shift reaction part for reducing the concentration of carbon monoxide in the outlet gas of the reforming part by shift reaction, and a selective oxidation reaction part having a selective oxidation catalyst bed packed with a selective oxidation catalyst which selectively oxidizes carbon monoxide for further reducing the concentration of carbon monoxide in the outlet gas of the shift reaction part; and a fuel cell which generates electric power using the gas obtained from the hydrogen production apparatus, wherein the fuel cell system includes an oxygen absorbent bed packed with an oxygen absorbent capable of absorbing oxygen and capable of being regenerated by a reducing gas, and the oxygen absorbent bed and the selective oxidation catalyst bed are stacked with the oxygen absorbent bed on the downstream side, and the fuel cell system includes means for opening the downstream of the oxygen absorbent bed to the atmosphere.

According to the present invention, provided is a method for operating the above-described fuel cell system, including:

opening the downstream of the oxygen absorbent bed to the atmosphere upon shutting down the fuel cell system; and regenerating the oxygen absorbent using the hydrogen-containing gas when hydrogen is produced by the hydrogen production apparatus.

Advantages of the Invention

According to the present invention, there is provided a hydrogen production apparatus which can more reliably suppress catalyst degradation due to oxidation in the hydrogen production apparatus even when start-ups and shutdowns are repeated without carrying out a purge operation upon shutting down the hydrogen production apparatus.

According to the present invention, there are provided a fuel cell system and an operation method thereof which can more reliably suppress catalyst degradation due to oxidation in the hydrogen production apparatus even when start-ups and shutdowns are repeated without carrying out a purge operation upon shutting down the fuel cell system.

DESCRIPTION OF THE SYMBOLS

Figure 1:
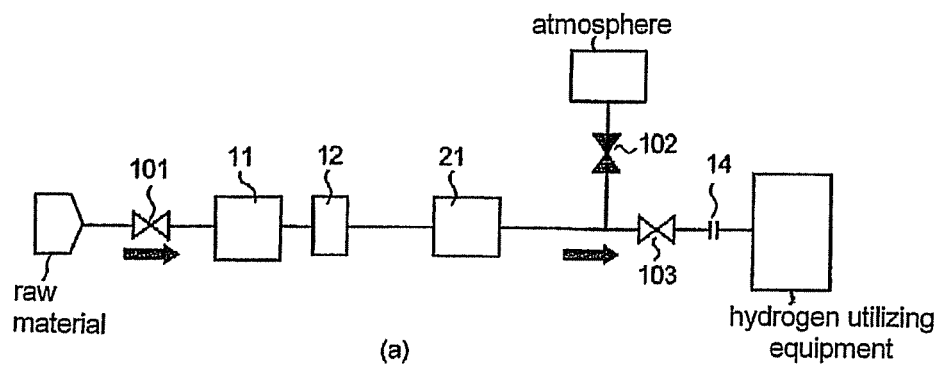
FIG. 1 is a series of flow diagrams illustrating the outline of an embodiment of the hydrogen production apparatus according to the present invention.
Figure 1:
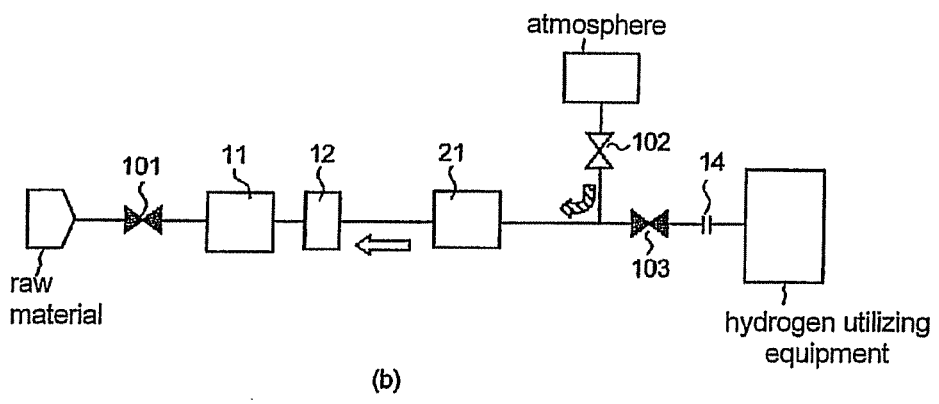

2 Fuel cell
2a Anode chamber
2c Cathode chamber
4 Air pressure increasing means
6 Buffer tank
11 Reformer
11a Reforming reaction tube
11b Burner
12 Shift reactor
14 Product gas outlet
21 Selective oxidation reactor equipped with an oxygen absorbent bed
100 Hydrogen production apparatus
101, 102, 103, and 104 Valve
110 Branch point
200 Current controller
201 Oxygen sensor
301 Vessel
302 Selective oxidation catalyst bed
303 Oxygen absorbent bed
311 Gas inlet
312 Gas outlet
321 Water inlet
322 Cooling pipe
323 Water outlet

BEST MODE FOR CARRYING OUT THE INVENTION

Upon shutting down a hydrogen production apparatus or a fuel cell system, if the hydrogen production apparatus is shut off from the atmosphere without purging, the pressure in the interior of the hydrogen production apparatus becomes negative as the temperature of the hydrogen production apparatus decreases. Air flows into the negative-pressure portion from the atmosphere, whereby there is a risk that the catalyst included in the hydrogen production apparatus may degrade due to oxidation. Further, the device may be damaged because of the negative pressure. To prevent such a state from occurring, in the present invention, oxygen in the air is removed by utilizing an oxygen absorbent, and air with a reduced oxygen concentration (hereinafter referred to as "oxygen-removed air") can spontaneously flow into the hydrogen production apparatus from the downstream side of the selective oxidation catalyst bed.

Further, an oxygen absorbent which can be regenerated by a reducing gas is used as the oxygen absorbent. As a result, it is possible to regenerate the oxygen absorbent using a hydrogen-containing gas at the outlet of the selective oxidation reaction part when hydrogen is produced. The hydrogen-containing gas is a gas which substantially contains hydrogen.

In the present invention, unless otherwise stated, "upstream" or "downstream" are based on the flow direction of the gas during operation (for a hydrogen production apparatus, when hydrogen is produced, and for a fuel cell system, when electric power is generated).

[Hydrogen Production Apparatus]

The hydrogen production apparatus is an apparatus which produces a gas containing hydrogen from a raw material for hydrogen production. The product gas which is obtained by the hydrogen production apparatus is utilized, for example, by being supplied to the anode chamber of a fuel cell. Further, it is possible to store the product gas and to utilize it for supplying it to an automobile or the like at a hydrogen station.

In the present invention, the hydrogen production apparatus is equipped with a reforming part, such as a reformer, for producing a hydrogen-containing gas by reforming the raw material for hydrogen production by a reforming reaction. The hydrogen production apparatus is also equipped with a shift reaction part, such as a shift reactor, in the downstream of the reforming part for reducing the concentration of carbon monoxide, and equipped with a selective oxidation reaction part, such as a selective oxidation reactor, in the downstream of the shift reaction part for further reducing the concentration of carbon monoxide. In addition, the hydrogen production apparatus may be equipped with a desulfurizer for reducing the concentration of sulfur content in the raw material for hydrogen production in the upstream of the reformer, as necessary.

[Reformer]

In the reformer, water (steam) and/or oxygen is reacted with the raw material for hydrogen production to produce a reformed gas which contains hydrogen. The raw material for hydrogen production is decomposed into mainly hydrogen and carbon monoxide by this apparatus. Further, usually, carbon dioxide and methane are also contained in the decomposed gas. Examples of the reforming reaction include steam-reforming reaction, autothermal reforming reaction, and partial oxidation reaction.

In the steam-reforming reaction, steam and the raw material for hydrogen production are reacted. Since this reaction absorbs a large amount of heat, usually external heating is required. Generally, the reaction is carried out in the presence of a metal catalyst, with typical examples thereof including VIII group metals such as nickel, cobalt, iron, ruthenium, rhodium, iridium, platinum. The reaction may be carried out at a temperature ranging from 450° C. to 900° C., preferably from 500° C. to 850° C., and more preferably from 550° C. to 800° C. The amount of steam introduced into the reaction system is defined by the ratio of the number of moles of water molecules to the number of moles of carbon atoms included in the raw material for hydrogen production (steam/carbon ratio). The value of this ratio is preferably from 0.5 to 10, more preferably from 1 to 7, and even more preferably from 2 to 5. If the raw material for hydrogen production is a liquid, the space velocity (LHSV) can be expressed as A/B, wherein A (l/h) is the velocity of the raw material for hydrogen production in a liquid state, and B (L) is the catalyst bed volume. This value is preferably set in the range of from 0.05 to 20 $h^{-1}$, more preferably from 0.1 to 10 $h^{-1}$, and even more preferably from 0.2 to 5 $h^{-1}$.

An autothermal reforming reaction is a reforming method in which reaction heats are balanced by oxidizing a part of the raw material for hydrogen production while allowing a steam-reforming reaction to proceed with the heat generated by the oxidation reaction. Since the start-up time is relatively short and the control is relatively easy, recently the autothermal reforming reaction has gained attention as a hydrogen production method for fuel cells. In this case as well, generally, the reaction is carried out in the presence of a metal catalyst, with typical examples thereof including VIII group metals such as nickel, cobalt, iron, ruthenium, rhodium, iridium, platinum. With respect to the amount of steam introduced into the reaction system, the steam/carbon ratio is preferably from 0.3 to 10, more preferably from 0.5 to 5, and even more preferably from 1 to 3.

In autothermal reforming, oxygen is added to the raw material in addition to steam. Although pure oxygen may be used for the oxygen source, in many cases air is used. Generally, the oxygen is added at such amount that can generate an amount of heat capable of balancing the endothermic reaction resulting from the steam-reforming reaction. However, the amount to be added can be determined, as appropriate, in relation to heat loss and external heating which may be provided as necessary. With respect to the amount of oxygen, the ratio of the number of moles of oxygen molecules to the number of moles of carbon atoms included in the raw material for hydrogen production (oxygen/carbon ratio) is preferably from 0.05 to 1, more preferably from 0.1 to 0.75, and even more preferably from 0.2 to 0.6. The reaction temperature for the autothermal reforming reaction is, in the same manner as for a steam-reforming reaction, set in the range of from 450° C. to 900° C., preferably from 500° C. to 850° C., and more preferably from 550° C. to 800° C. If the raw material for hydrogen production is a liquid, the space velocity (LHSV) may be selected within the range of from 0.1 to 30, more preferably from 0.5 to 20, and even more preferably from 1 to 10.

A partial oxidation reaction is a method in which the reforming reaction proceeds with oxidizing the raw material for hydrogen production. Since the start-up time is relatively short and compact design of the apparatus is possible, the partial oxidation reaction is gaining attention as a hydrogen production method. While a catalyst may or may not be used, if a catalyst is used, the reaction is generally carried out in the presence of a metal catalyst, with typical examples thereof including VIII group metals such as nickel, cobalt, iron, ruthenium, rhodium, iridium and platinum, and a perovskite or a spinel type oxide catalyst. To suppress the generation of soot, steam can be introduced to the reaction system. With respect to the amount of steam, the steam/carbon ratio is preferably from 0.1 to 5, more preferably from 0.1 to 3, and even more preferably from 1 to 2.

In partial oxidation reforming, oxygen is added to the raw material. Although pure oxygen may be used for the oxygen source, in many cases air is used. To secure a temperature for making the reaction proceed, the amount to be added is determined, as appropriate, in relation to heat loss and the like. With respect to the amount of oxygen, the ratio of the number of moles of oxygen molecules to the number of moles of carbon atoms included in the raw material for hydrogen production (oxygen/carbon ratio) is preferably from 0.1 to 3, and more preferably from 0.2 to 0.7. The reaction temperature of the partial oxidation reaction may be, in the case of not using a catalyst, set in the range of from 1,000 to 1,300° C. In the case of using a catalyst, the reaction temperature may be, in the same manner as for a steam-reforming reaction, set in the range of from 450° C. to 900° C., preferably from 500° C. to 850° C., and more preferably from 550° C. to 800° C. If the raw material for hydrogen production is a liquid, the space velocity (LHSV) is preferably selected within the range of from 0.1 to 30.

In the present invention, a known reformer which can carry out the above-described reforming reaction can be utilized as the reformer.

[Raw Material for Hydrogen Production]

As the raw material for hydrogen production, a substance from which a reformed gas containing hydrogen can be obtained by the above-described reforming reaction may be used. Examples thereof include compounds having carbon and hydrogen in the molecule, such as hydrocarbons, alcohols, and ethers. Preferred examples thereof which can be acquired at low cost for industrial or consumer use include methanol, ethanol, dimethyl ether, city gas, LPG (liquefied petroleum gas), gasoline, kerosene and the like. Among these, kerosene is preferred, as it can be easily acquired both industrially and domestically, and it is easily handled.

[Shift Reactor]

In addition to hydrogen, the gas generated by the reformer contains, for example, carbon monoxide, carbon dioxide, methane, steam. Further, nitrogen is also contained when air is used as the oxygen source in autothermal reforming and partial oxidation reforming. The shift reactor carries out a shift reaction in which carbon monoxide, contained in the reformed gas, is reacted with water and converted into hydrogen and carbon dioxide. Generally, the reaction proceeds in the presence of a catalyst. Using a catalyst containing a mixed oxide of Fe—Cr, a mixed oxide of Zn—Cu, or a noble metal such as platinum, ruthenium and iridium, the carbon monoxide content (dry base mole %) is decreased to preferably 2% or less, more preferably 1% or less, and still more preferably 0.5% or less. The shift reaction may be carried out in two steps. In such a case, a high-temperature shift reactor and a low-temperature shift reactor are used.

Since the above-described shift reaction is an exothermic reaction, low-temperature operating conditions are preferable according to the equilibrium theory. However in practice, depending on the temperature at which the activity of the used catalyst is exhibited, a certain level of temperature is maintained. Specifically, when carrying out the shift reaction in one step, usually the temperature is in the range of from 100 to 450° C., preferably from 120 to 400° C., and more preferably from 150 to 350° C. If the temperature is 100° C. or more, it is easy to suppress the CO adsorption by the catalyst itself and to make the catalyst exhibit excellent activity. As a result, it is easy to carry out good CO conversion. If the temperature is 450° C. or less, it is easy to suppress an increase in CO concentration according to the equilibrium theory, and to carry out good CO conversion.

[Selective Oxidation Reaction Part]

To further reduce the carbon monoxide concentration in the shift reactor outlet gas, a selective oxidation reaction part is provided. A selective oxidation catalyst bed packed with a selective oxidation catalyst for selectively oxidizing the carbon monoxide may be used in the selective oxidation reaction part, and the shift reactor outlet gas may be treated by selective oxidation reaction. A selective oxidation reactor provided with a selective oxidation catalyst bed in a vessel may be used for this purpose.

In the selective oxidation reaction, the carbon monoxide concentration is preferably reduced to 10 ppm or less (dry-base mole basis) by using a catalyst containing iron, cobalt, nickel, ruthenium, rhodium, palladium, osmium, iridium, platinum, copper, silver, gold or the like, and adding, based on the number of moles of the remaining carbon monoxide, preferably from 0.5 to 10 times, more preferably from 0.7 to 5 times, and even more preferably from 1 to 3 times moles of oxygen to selectively convert the carbon monoxide into carbon dioxide. In such case, the carbon monoxide concentration may be reduced by reacting coexisting hydrogen with carbon monoxide to form methane simultaneously with the oxidation of the carbon monoxide. The selective oxidation reaction may be carried out in two steps. If the selective oxidation catalyst contains Ru, the Ru content may be, for example, 0.02 mass % or more and less than 1 mass %. The Ru content is preferably 0.05 mass % or more and 0.75 mass % or less, and more preferably 0.1 mass % or more and 0.5 mass % or less.

Although it depends on the used catalyst and the structure of the vessel, the selective oxidation reaction is usually carried out in the range of from 50 to 250° C., preferably from 60 to 220° C., and more preferably from 80 to 200° C. If the temperature is 50° C. or more, excellent catalyst activity is exhibited, and it is easy to excellently reduce the CO concentration. Further, if the temperature is 250° C. or less, in the CO selective oxidation, it is easy to make excellent combustion selectivity be exhibited, to suppress the consumption of hydrogen, to suppress an increase in the catalyst bed temperature, and to obtain an excellent efficiency of reforming process in the whole hydrogen production apparatus. In addition, in the methanation reaction, it is easy to suppress $CO_2$ which coexists in a large amount from being methanated, and to avoid a thermal runaway state.

[Desulfurizer]

It is desirable to reduce the concentration of sulfur in the raw material for hydrogen production as much as possible, since sulfur has an effect of deactivating the reforming catalyst. Preferably, the concentration is 0.1 ppm by mass or less, and more preferably 50 ppb by mass or less. The raw material for hydrogen production may be desulfurized beforehand as necessary. The sulfur concentration in the raw material to be supplied to the desulfurization step is not especially limited, and a raw material may be used as long as its sulfur concentration can be converted into the above-described concentration in the desulfurization step.

An example of the desulfurization method includes, but is not especially limited to, carrying out hydrodesulfurization in the presence of a suitable catalyst and hydrogen, then absorbing generated hydrogen sulfide on zinc oxide or the like. Examples of the catalyst which can be used in this case include catalysts having a component of nickel-molybdenum, cobalt-molybdenum or the like. On the other hand, a method in which the sulfur component is adsorbed in the presence of a suitable adsorbent, and hydrogen as necessary, may also be employed. Examples of the adsorbent which may be used in such a case include adsorbents having a main component of copper-zinc or of nickel-zinc, as disclosed in Japanese Patent Nos. 2654515 and 2688749.

[Composition of the Hydrogen-Containing Gas]

The composition (dry base mole %) of the gas which has undergone a reforming reaction is, if the steam-reforming reaction is used for reforming, usually, for example, from 63 to 73% hydrogen, from 0.1 to 5% methane, from 5 to 20% carbon dioxide, and from 5 to 20% carbon monoxide. On the other hand, if the autothermal reforming reaction is used, the composition (dry base mole %) is usually, for example, from 23 to 37% hydrogen, from 0.1 to 5% methane, from 5 to 25% carbon dioxide, from 5 to 25% carbon monoxide, and from 30 to 60% nitrogen. If the partial oxidation reaction is used, the composition (dry base mole %) is usually, for example, from 15 to 35% hydrogen, from 0.1 to 5% methane, from 10 to 30% carbon monoxide, from 10 to 40% carbon dioxide, and from 30 to 60% nitrogen.

The composition (dry base mole % or mole ppm) of the gas which has undergone the reforming reaction and the shift reaction is, if the steam-reforming reaction is used for reforming, usually, for example, from 65 to 75% hydrogen, from 0.1 to 5% methane, from 20 to 30% carbon dioxide, and from 1,000 to 10,000 ppm carbon monoxide. On the other hand, if the autothermal reforming reaction is used, the composition (dry base mole % or mole ppm) is usually, for example, from 25 to 40% hydrogen, from 0.1 to 5% methane, from 20 to 40% carbon dioxide, from 1,000 to 10,000 ppm carbon monoxide, and from 30 to 54% nitrogen. If the partial oxidation reaction is used, the composition (dry base mole %) is usually, for example, from 20 to 40% hydrogen, from 0.1 to 5% methane, from 1,000 to 10,000 ppm carbon monoxide, from 20 to 45% carbon dioxide, and from 30 to 55% nitrogen.

The composition (dry base mole %) of the gas which has undergone the reforming reaction, the shift reaction, and the selective oxidation reaction is, if the steam-reforming reaction is used for reforming, usually, for example, from 65 to 75% hydrogen, from 0.1 to 5% methane, from 20 to 30% carbon dioxide, and from 1 to 10% nitrogen. On the other hand, if the autothermal reforming reaction is used, the composition (dry base mole %) is usually, for example, from 25 to 40% hydrogen, from 0.1 to 5% methane, from 20 to 40% carbon dioxide, and from 30 to 54% nitrogen. If the partial oxidation reforming reaction is used, the composition (dry base mole %) is usually, for example, from 20 to 40% hydrogen, from 0.1 to 5% methane, from 20 to 45% carbon dioxide, and from 30 to 55% nitrogen.

[Fuel Cell]

With respect to the fuel cell, a type of a fuel cell in which hydrogen is the reactant of the electrode reaction at the fuel electrode may be appropriately employed. Examples of fuel cells which can be used include a polymer electrolyte type, a phosphoric acid type, a molten carbonate type, and a solid oxide type. Hereinafter, the structure of a polymer electrolyte fuel cell will be described.

The fuel cell electrodes include an anode (fuel electrode), a cathode (air electrode), and a solid polymer electrolyte which is sandwiched between these. A hydrogen-containing gas produced by the above-described hydrogen production apparatus is introduced on the anode side, and an oxygen-containing gas such as air is introduced on the cathode side. These gases may be introduced after being subjected to a suitable humidification treatment as necessary.

At the anode, a reaction proceeds in which the hydrogen gas is turned into protons and electrons are released, and at the cathode, a reaction proceeds in which the oxygen gas receives protons and electrons to form water. To promote these reactions, respectively, at the anode, a catalyst such as platinum black, Pt catalyst supported on activated carbon, or Pt—Ru alloy catalyst is used, and at the cathode, a catalyst such as platinum black or Pt catalyst supported on activated carbon is used. Usually, both the catalysts of the anode and the cathode are formed on a porous catalyst layer, along with tetrafluoroethylene, a low-molecular weight polymer electrolyte membrane material, activated carbon and the like as necessary.

As the solid polymer electrolyte, typically a polymer electrolyte membrane known under a product name such as Nafion (manufactured by DuPont), Gore (manufactured by W. L. Gore & Associates, Inc.), Flemion (manufactured by Asahi Glass Co., Ltd.), and Aciplex (manufactured by Asahi Kasei Corporation), is used. The above-described porous catalyst layer is laminated on either side of such membrane to form a membrane electrode assembly (MEA). The fuel cell is assembled by then sandwiching this MEA with separators which are composed of a metal material, graphite, a carbon composite or the like, and which have a gas supplying function, a current collection function, and a water removing function that is especially important at the cathode. The electric load is electrically connected with the anode and the cathode.

[Oxygen Absorbent]

The oxygen absorbent is able to remove oxygen in air to obtain air having a reduced oxygen concentration.

The oxygen absorption capacity of the oxygen absorbent is, from the perspective of compactness of apparatus, preferably 2 or more, more preferably 3 or more, and even more preferably 5 or more. From the perspective of preventing hotspots from occurring, the oxygen absorption capacity is preferably 30 or less, more preferably 20 or less, and even more preferably 10 or less.

Here, "oxygen absorption capacity" is a dimensionless number defined as the normal volume (volume converted to 0° C., 0.101 MPa) of oxygen which can be absorbed per unit volume of the oxygen absorbent. The oxygen absorbent capacity can be determined by filling several tens to several hundreds of mL in bulk volume of the oxygen absorbent into a vessel, carrying out a given pre-treatment (e.g., a reduction pre-treatment) according to the oxygen absorbent as necessary, then flowing nitrogen-diluted oxygen through the vessel, and continuously analyzing the oxygen concentration in the outlet gas. At the point of time where a certain concentration of oxygen is detected in the outlet gas, the accumulated flow volume of oxygen which has flowed up until that point is converted to a normal value. The value of absorption capacity is determined by dividing the normal value by the catalyst volume. Here, the oxygen absorption may be carried out with an oxygen concentration in the oxygen-containing nitrogen supplied to the oxygen absorbent bed of 1 volume %, an oxygen concentration used for the determination of oxygen breakthrough of 100 ppm (volume basis), under conditions of a temperature of 80° C., a pressure of 0.1 MPa, and a GHSV (normal converted value) of 1,000 $h^{-1}$.

In the present invention, the selective oxidation catalyst bed provided in the selective oxidation reaction part and the oxygen absorbent bed packed with the oxygen absorbent are stacked. Here, the two beds are stacked with the oxygen absorbent bed on the downstream side, and thus the selective oxidation catalyst bed is on the upstream side. Further, means for opening up the downstream of the oxygen absorbent bed to the atmosphere is provided. This opening-to-the-atmosphere means can be appropriately formed with the use of a valve or a pipe. The immediate downstream of the oxygen absorbent bed may be open to the atmosphere, or the downstream of the oxygen absorbent bed may be open to the atmosphere via some other device.

As a result, during shutdown, the selective oxidation catalyst bed (and further, the upstream thereof) can be open to the atmosphere via the oxygen absorbent bed. Oxygen-removed air will accordingly flow to the selective oxidation catalyst bed, whereby degradation due to oxidation of the catalyst, such as the selective oxidation catalyst and the shift reaction catalyst which is upstream therefrom, can be more reliably prevented.

In the present invention, an oxygen absorbent which can be regenerated by a reducing gas is used. As a result, the oxygen absorbent is regenerated by the hydrogen-containing gas (selective oxidation catalyst bed outlet gas), which is a reducing gas, during hydrogen production, so that start-ups and shut-downs can be repeated without carrying out any separate regeneration treatment. An oxygen absorbent which can be regenerated at 80° C. or more and 150° C. or less may be used.

In the present invention, an oxygen absorbent containing at least one metal selected from the group consisting of Ru, Pt, Au, Ni, Co, Rh, Pd, Ir, Ag, and Re may be used. For example, if Ru is used, from the perspective of oxygen absorption capacity and regeneration capacity, the Ru content in an oxygen absorbent is preferably 1 mass % or more, more preferably 1.5 mass % or more, and even more preferably 2 mass % or more. From the perspective of preventing hotspots from occurring, the Ru content is preferably 10 mass % or less, more preferably 7.5 mass % or less, and even more preferably 5 mass % or less.

Further, in the present invention, an oxygen absorbent containing at least one oxide selected from ceria, zirconia, titania, yttria, manganese oxide, tin oxide, iron oxide, copper oxide, and zinc oxide may be used.

There may be used an oxygen absorbent in which the above-described oxide is used as a support and the above-described metal is supported on this support. Alternatively, a support may be used in which the above-described oxide is added to an oxide other than the above-described oxide. For example, there may be used a support which includes alumina as a main component and to which at least one component selected from the group consisting of ceria, zirconia and yttria is added. In such a case, from the perspective of oxygen absorption capacity, the total content of the ceria, zirconia and yttria is preferably 5 mass % or more based on the mass of the catalyst.

In the present invention, the oxygen absorbent bed packed with an oxygen absorbent is arranged on the downstream side of the selective oxidation catalyst bed, and the selective oxidation catalyst bed and the oxygen absorbent bed are stacked. As a result, during hydrogen production, the oxygen absorbent can be efficiently heated by the heat generated by the selective oxidation reaction, and the oxygen absorbent can easily be at a preferable regenerating temperature.

The selective oxidation catalyst bed and the oxygen absorbent bed may be stacked in a single vessel. For example, the oxygen absorbent bed and the selective oxidation catalyst bed may be stacked inside the selective oxidation reactor. As in such a case, when giving oxygen absorption capacity to the vessel containing the selective oxidation catalyst, a vessel structure which gives preference to the function of selective oxidation, for example, a reactor having a large heat transfer area for releasing the heat produced by the catalytic reaction, may be adopted as is, as long as oxygen absorption can be practically carried out.

A heating means, for example an electric heater, for heating the oxygen absorbent may be provided as necessary. Heating may be carried out by a dedicated burner used in an exclusive manner for heating the oxygen absorbent, instead of, or in addition to, the electric heater. When using a dedicated burner, combustion of the dedicated burner may be continued even after the shutdown.

Alternatively, each of the heat sources generated in the fuel cell system, for example, heat produced by the exothermic reactions in the hydrogen production apparatus, such as the shift reaction and the CO selective oxidation reaction, and the heat generated from the fuel cell itself, may be provided to the oxygen absorbent via a heat medium such as hot water or the like.

Further, as necessary, a cooling system for cooling the oxygen absorbent may also be provided. The cooling system may employ an embodiment, such as a water-cooled jacket, in which channels are provided on the walls of the vessel containing the oxygen absorbent through which a cooling medium such as water or steam is flowed, or an embodiment in which a cooling medium is flowed by providing pipes which pass through the vessel.

Next, the preferred conditions of use for the oxygen absorbent will be described.

During a shutdown of the hydrogen production apparatus or the fuel cell system, oxygen in the air is absorbed in the oxygen absorbent. During the absorption, from the perspectives of preventing the occurrence of hotspots and degradation due to oxidation of the oxygen absorbent, the temperature of the oxygen absorbent is preferably 200° C. or less, more preferably 150° C. or less, and even more preferably 100° C. or less.

In order to regenerate the oxygen absorbent which has absorbed oxygen, the oxygen absorbent is at a temperature of preferably 60° C. or more, more preferably 70° C. or more, and even more preferably 80° C. or more in a reducing gas (selective oxidation catalyst bed outlet gas) atmosphere.

Further, if the oxygen absorbent is in a reducing gas atmosphere, from the perspective of preventing the methanation reaction from going out of control, the oxygen absorbent is preferably 250° C. or less, more preferably 200° C. or less, and even more preferably 150° C. or less.

Examples of methods which can be used for controlling the temperature to be in the above-described ranges include cooling the catalyst bed via a water pipe, and cooling the outer surface of a tubular vessel with air. Further, the temperature may be controlled by arranging a cooling water pipes commonly trough the oxygen absorbent bed and the selective oxidation catalyst bed to cool these catalysts. The water pipe can exhibit a cooling effect during the period of the exothermic reaction resulting from oxygen absorption, such as when passing through the reducing gas, when passing through air, or the like. Conversely, when the oxygen absorbent bed is cooled to 70° C. or less, the pipe may be used as a means for heating the oxygen absorbent bed.

[Form of the Catalyst and Oxygen Absorbent]

The forms of the desulfurizing catalyst (including the sorbent), the reforming catalyst, the shift reaction catalyst, the selective oxidation catalyst, and the oxygen absorbent may all be selected appropriately. Although the forms are typically a pellet, a honeycomb form or the like may be used according to circumstances.

[Oxygen-Removed Air]

In the present invention, from the perspective of protecting the catalyst contained in the reformer and the like, oxygen in the air is removed by an oxygen absorbent. The oxygen concentration in the air from which oxygen has been removed by an oxygen absorbent is desirably as low as possible. Given as an oxygen concentration in terms of a dry base free from moisture, the concentration is preferably in the range of 1 mole % or less, more preferably 0.2 mole % or less, even more preferably 500 ppm by mole or less, and most preferably 100 ppm by mole or less.

As will be described below, prior to the oxygen removal by the oxygen absorbent, oxygen removal may also be carried out by the fuel cell. The preferred oxygen concentrations for either oxygen-removed air in the case of removing the oxygen with just an oxygen absorbent, or for oxygen-removed air in the case of using a fuel cell and an oxygen absorbent, are as described above.

[Oxygen Sensor and Oxygen Concentration Control Means]

When obtaining oxygen-removed air from a fuel cell, it is preferred to detect the oxygen concentration of the cathode chamber outlet gas of the fuel cell by an oxygen sensor, send a signal corresponding to the oxygen concentration from the oxygen sensor to a computer, a sequencer or the like, and control the current generated in the fuel cell, to adjust the oxygen concentration of the cathode chamber outlet gas to a predetermined range. As the oxygen sensor, a well-known sensor capable of measuring the oxygen concentration in a gas can be appropriately used. As the means for adjusting the oxygen concentration, a well-known control technique can be appropriately employed. For example, it is possible to form the means for adjusting the oxygen concentration by combining a current control means, such as a well-known current controller, with a control apparatus, such as a computer, a sequencer or the like capable of forming a control circuit such as a well-known feedback control circuit, and connecting a signal pathway which transmits the signals from the oxygen sensor to the feedback control circuit.

The present invention will now be described in more detail using the drawings. However, the present invention is not limited to the following description. Further, in the illustration of the valves in the drawings, black-outlined valves indicate an opened valve, and solid black valves indicate a closed valve. Solid black arrows indicate the forced flow direction of the fluid. Hatched arrows indicate the direction in which air from the atmosphere spontaneously flows as the temperature decreases. The black-outlined arrows indicate the direction in which oxygen-removed air spontaneously flows as the temperature decreases.

[First Embodiment of the Hydrogen Production Apparatus]

FIG. 1 is a series of flow diagrams representing the outline of an embodiment of the hydrogen production apparatus according to the present invention. As illustrated in FIG. 1(a), during operation of the hydrogen production apparatus, a raw material supply valve 101 is open, so that the raw material for hydrogen production is supplied to a reformer 11. At this stage, the pressure of the raw material for hydrogen production may be increased by a pressure-increasing means such as a pump or a blower as necessary. Further, other substances required for hydrogen production, such as the reforming reaction reactants other than the raw material for hydrogen production, may also be appropriately supplied to the hydrogen production apparatus. For example, if steam is required for the reforming reaction, steam or water may be supplied to the hydrogen production apparatus, and if oxygen is required for the reforming reaction, an oxygen-containing gas such as air may be supplied to the hydrogen production apparatus. Further, an oxygen-containing gas such as air for an oxidation reaction may also be supplied to a selective oxidation reactor.

In the reformer 11, a reformed gas, which is a hydrogen-containing gas, is produced by a reforming reaction. If the reformer is an externally-heated type reformer, that is, if the reformer is a type in which the required heat is supplied to the reforming reaction by heating a reaction tube containing the reforming catalyst with an external combustion means such as a burner, the fuel and air for this combustion may be appropriately supplied.

FIG. 1 illustrates a hydrogen production apparatus which produces a hydrogen-containing gas suitable for, for example, a polymer electrolyte fuel cell. In FIG. 1, a shift reactor 12 and a selective oxidation reactor 21 are arranged downstream of the reformer in this order from the upstream side with respect to the flow direction of the hydrogen-containing gas, whereby the carbon monoxide concentration in the reformed gas is reduced to form a product gas. It is possible to condense the water in the gas to produce the product gas. During hydrogen production, the line in which the hydrogen-containing gas flows is a line through which a gas which essentially contains hydrogen flows during hydrogen production, and is the line from the reformer 11 to the product gas outlet 14.

Figure 2:
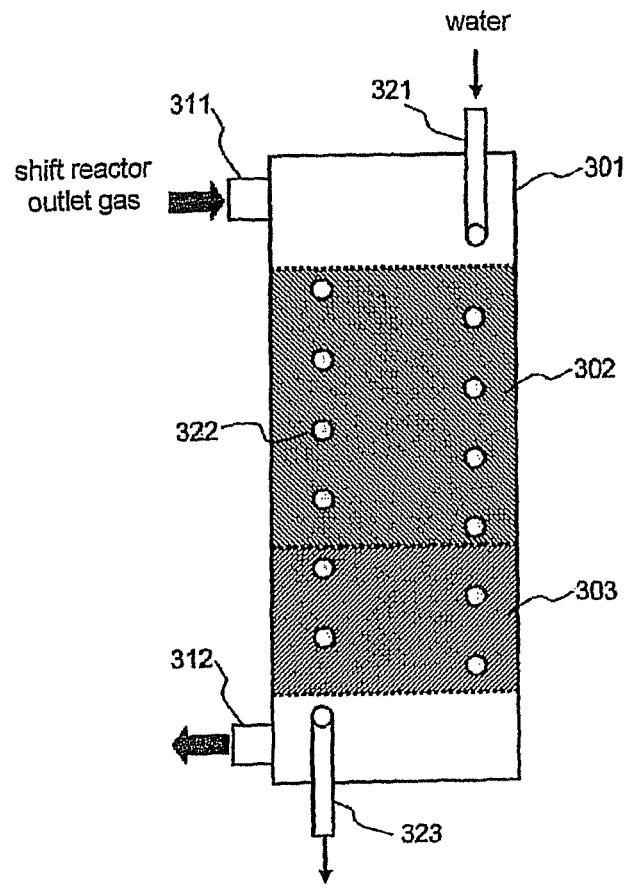
FIG. 2 is a schematic cross-sectional view illustrating an example of a selective oxidation reactor equipped with an oxygen absorbent bed.

FIG. 2 illustrates an example of a configuration of a selective oxidation reactor 21. The reactor has a vessel 301 capable of being closed off from the atmosphere. In this vessel, a selective oxidation catalyst bed 302 filled with a selective oxidation catalyst and an oxygen absorbent bed 303 filled with an oxygen absorbent are stacked. The oxygen absorbent bed is arranged on the downstream side with respect to the flow of the hydrogen-containing gas.

During hydrogen production, the outlet gas of the shift reactor 12 is supplied to the reactor 21. Specifically, this shift reactor outlet gas is introduced from a gas inlet 311, and passes through the selective oxidation catalyst bed and the oxygen absorbent bed in this order, and is withdrawn from a gas outlet 312. At this stage, the CO removal is carried out at the selective oxidation catalyst bed. At the oxygen absorbent bed, the oxygen absorbent can be regenerated by the hydrogen-containing gas (selective oxidation catalyst bed outlet gas). A valve 102 is closed, and a valve 103 is opened, so that the withdrawn hydrogen-containing gas is supplied via the valve 103 as a product gas from the product gas outlet 14 to equipment connected downstream, such as hydrogen utilizing equipment, hydrogen storage equipment.

Further, a coil-shaped cooling pipe 322 which passes through the selective oxidation catalyst bed and the oxygen absorbent bed is provided in the reactor 21. Cooling water introduced from a water inlet 321 passes through the coil-shaped cooling pipe 322 and is discharged from a water outlet 323. During hydrogen production, heat is generated at the selective oxidation catalyst bed by the oxidation reaction. This heat can be removed by the cooling pipe 322, and can be provided to the oxygen absorbent.

As illustrated in FIG. 1(b), during a shutdown, the supply of the raw material for hydrogen production is stopped, and the raw material supply line is shut off by closing the raw material supply valve 101. If steam, water, air or the like is supplied as the reforming reaction reactant, or if steam or water is supplied for preventing carbon deposition, supply lines thereof may also be appropriately shut off. Further, if fuel and air for combustion are supplied to the reformer, supply lines thereof may also be appropriately shut off. Moreover, the supply line for the oxygen-containing gas, such as air, supplied to the selective oxidation reactor may also be appropriately shut off. Thus, the supply of the substances supplied to the hydrogen production apparatus is stopped, and those supply lines are shut off. However, if a device such as a dedicated burner for heating the oxygen absorbent which keeps burning after the shutdown is provided, the substances required for such device are supplied.

Further, by opening the valve 102, the line downstream of the selective oxidation reactor 21 through which the hydrogen-containing gas flows is opened to the atmosphere. On the other hand, by closing the valve 103, the line through which the hydrogen-containing gas flows from the reformer to the product gas outlet is shut off at the downstream of the selective oxidation reactor 21.

Thus, by stopping the supply of supply substances to the hydrogen production apparatus and shutting off that supply line, and by switching the line from the reformer to the product gas outlet to the line connecting to the atmosphere at the downstream of the oxygen absorbent bed and optionally heating the oxygen absorbent, as the temperature of the hydrogen production apparatus decreases, oxygen-removed air from which the oxygen was removed by the oxygen absorbent passes through the selective oxidation catalyst bed, and spontaneously flows from the gas inlet 311 to the shift reactor 12 and to the reformer 11. As a result, without purging, the inside pressure of the hydrogen production apparatus can be prevented from becoming negative, and degradation due to oxidation of the catalyst can be prevented.

In cases where the effects of the atmosphere entering the hydrogen production apparatus through diffusion cannot be ignored, such as when the apparatus is stopped for a long time, the hydrogen production apparatus may be shut off from the atmosphere by also closing the valve 102 when the portion into which the oxygen-removed air spontaneously flows is cooled down to about the ambient temperature, and when problems due to negative pressure can be ignored.

Further, in the case of heating the oxygen absorbent, during the shutdown, power supply to an electric heater or combustion of a dedicated burner may be started and continued appropriately (e.g. until the negative pressure due to the temperature decrease can be ignored). Also, in the case of cooling the oxygen absorbent, during the shutdown, a cooling system may be operated, and the cooling may be appropriately (e.g. until the negative pressure due to the temperature decrease can be ignored) continued.

Here, an example of switching the line by switching stop valves was described. However, the present invention is not limited to this, and for example a three-way valve may be utilized.

In the hydrogen production apparatus according to the present invention, the above operations may all be carried out automatically using a control apparatus such as a computer or sequencer for control, and using automatic valves for the valves.

In the hydrogen production apparatus according to the present invention, the above operations, specifically, stopping the supply of the supply substances to the hydrogen production apparatus and the shutting off of the lines thereof, the line switching to a line open to the atmosphere, and the operation of the heating means for heating the oxygen absorbent, may be carried out simultaneously. Therefore, the shutdown operation is simple. Further, since there is no need to operate a device such as a blower for purging after the shutdown, the energy for such device is also unnecessary, thus, there is an energy saving effect. Even if the oxygen absorbent has to be heated by a heating means such as an electric heater or a dedicated burner after the shutdown, such operation is a simple operation on a very limited portion, and the required energy is small.

[Second Embodiment of the Hydrogen Production Apparatus]

Figure 3:
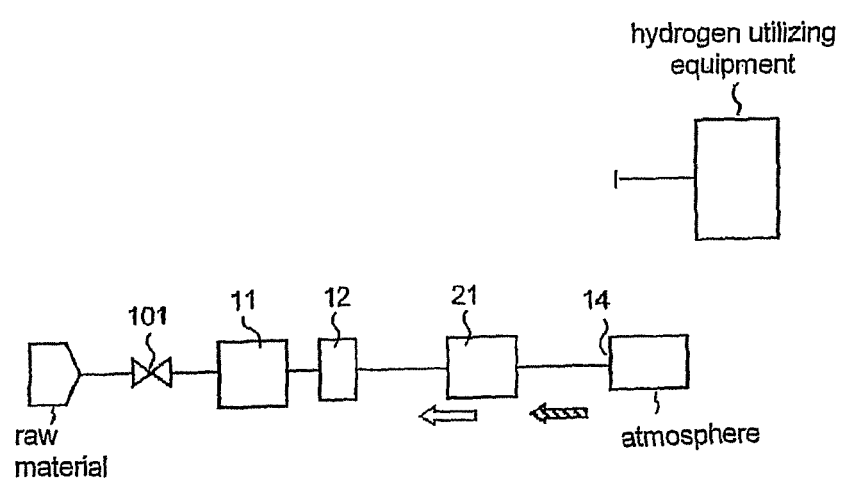
FIG. 3 is a flow diagram illustrating the outline of another embodiment of the hydrogen production apparatus according to the present invention.

FIG. 3 illustrates another embodiment of the hydrogen production apparatus according to the present invention (only the state during shutdown is illustrated). As illustrated in FIG. 2, the selective oxidation reactor has a structure in which a selective oxidation catalyst bed and an oxygen absorbent bed are stacked in the interior, and the oxygen absorbent bed is arranged on the downstream side. This embodiment can be suitably used in cases where the product gas outlet is open to the atmosphere during shutdown, such as when the hydrogen utilizing equipment is detached during shutdown of the hydrogen production apparatus. In this embodiment, as illustrated in FIG. 3, the product gas outlet 14 is arranged immediately downstream of the selective oxidation reactor 21, there is no need to carry out line switching, and a valve as a line switching means is unnecessary (a valve as a shutoff means is necessary). During operation, the oxygen absorbent can be regenerated by the hydrogen-containing gas. During shutdown, oxygen in the air which spontaneously flows from the product gas outlet 14 opened to the atmosphere is removed by the oxygen absorbent bed in the selective oxidation reactor, so that oxygen-removed air spontaneously flows into the reformer and the like.

[First Embodiment of the Fuel Cell System]

Figure 4:
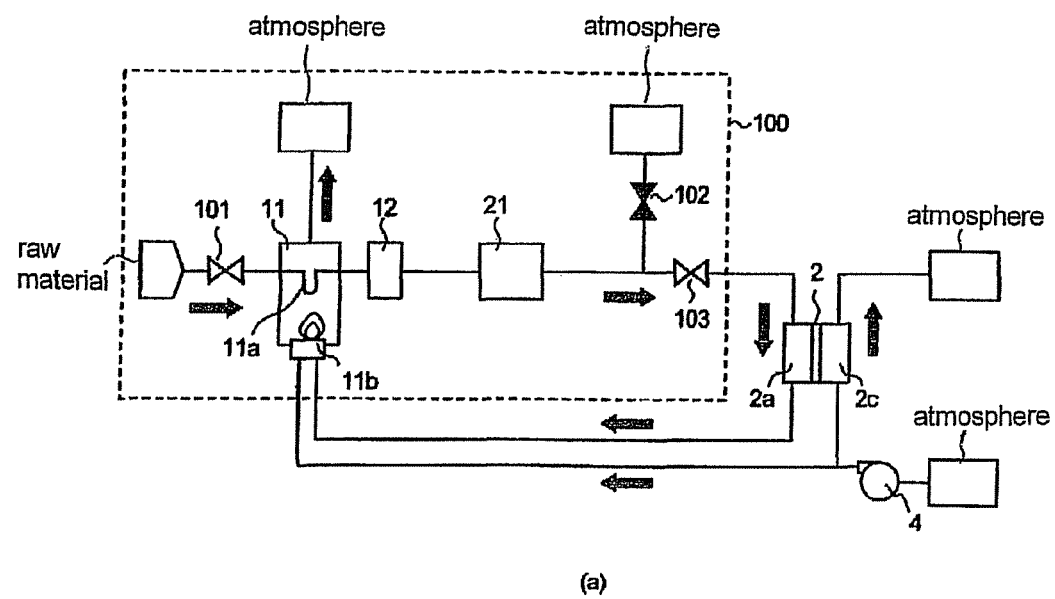
FIG. 4 is a series of flow diagrams illustrating the outline of an embodiment of the fuel cell system according to the present invention.
Figure 4:
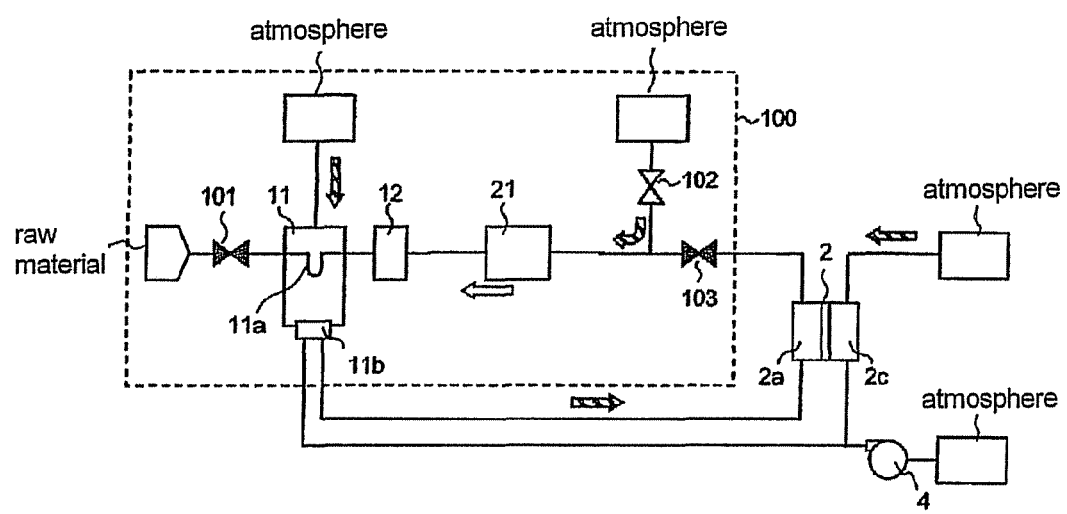

FIG. 4 is a series of flow diagrams illustrating the outline of an embodiment of the fuel cell system according to the present invention. This embodiment has a basic configuration which combines the hydrogen production apparatus 100 illustrated in FIG. 1 and a fuel cell 2, and is suitable for a polymer electrolyte fuel cell. As illustrated in FIG. 2, the selective oxidation reactor has a structure in which a selective oxidation catalyst bed and an oxygen absorbent bed are stacked in the interior, and the oxygen absorbent bed is arranged on the downstream side.

As illustrated in FIG. 4(a), during operation of the fuel cell system, the valve 102 is closed, and the valve 103 is open. The hydrogen-containing gas produced by the hydrogen production apparatus 100 is supplied to an anode chamber 2a of the fuel cell 2, and is used to generate power. Since the anode off gas discharged from the anode chamber contains combustible substances, the gas is burned by a burner 11b, which is provided in the reformer 11, for supplying the heat required for the reforming reaction. The heat from the combustion gas of the burner is appropriately recovered etc., and then the combustion gas is discharged to the atmosphere.

It is noted that the optionally-provided heating means, such as a burner, for supplying the heat required for the reforming reaction is not shown in FIG. 1 etc. relating to the hydrogen production apparatus. However, FIG. 4 etc. relating to a fuel cell system does show a burner, and in order to distinguish this burner, the region where the reforming reaction occurs is indicated as a reforming reaction tube 11a which is packed with a reforming catalyst. The reformer 11 in FIG. 1 etc. relating to the hydrogen production apparatus means the region where the reforming reaction occurs.

Further, air is supplied from the atmosphere to a cathode chamber 2c of the fuel cell by an air pressure increasing means 4, such as a blower or a compressor. After being used to produce power, the air is discharged to the atmosphere. The air used for combustion by the burner 11b is also supplied from the air pressure increasing means 4.

As illustrated in FIG. 4(b), when shutting down the fuel cell system, the supply of the raw material for hydrogen production is stopped, and the valve 101 is closed to shut off the raw material supply lines. If there is a substance supplied to the hydrogen production apparatus in addition to the raw material for hydrogen production, the supply thereof is stopped, and the supply line thereof is shut off by a valve or the like. Thus, the supply of substances which have been supplied to the hydrogen production apparatus 100 is stopped, and their supply lines are shut off. Further, the supply of a supply substance to the fuel cell system other than the substances which has been supplied to the hydrogen production apparatus 100 may also be stopped by stopping the air pressure increasing means 4 or the like. However, if there is a device such as a dedicated burner for heating the oxygen absorbent which should burn after the shutdown, a substance required for such device is supplied.

By closing the valve 103, the line including the reformer, through which line the hydrogen-containing gas has flowed, is shut off upstream of the anode chamber. Further, by opening the valve 102, a line which opens the downstream of the selective oxidation reactor 21 (upstream of the anode chamber) to the atmosphere is formed. That is, the line which goes from the selective oxidation reaction bed, through the oxygen absorbent bed and the anode chamber, to the anode off-gas line is switched to a line which opens the downstream of the oxygen absorbent bed to the atmosphere. As a result, air can flow to the oxygen absorbent bed from the valve 102, and oxygen-removed air can spontaneously flow to the selective oxidation catalyst bed, the shift reactor 12, and the reformer 11 (reforming reaction tube 11a). As in the case of the hydrogen production apparatus, the oxygen absorbent may be heated as necessary.

On the other hand, air from the atmosphere can spontaneously flow to the anode chamber 2a of the fuel cell from the combustion gas line of the reformer, which line is communicated with the atmosphere, via the burner 11b. Although a catalyst may also be used on the anode, for a polymer electrolyte fuel cell, for example, the fuel cell itself is relatively low temperature, so that in many cases the effects of a slight amount of oxygen mixing is ignorable.

Further, air from the cathode chamber outlet line can spontaneously flow to the cathode chamber 2c. Also, air can spontaneously flow to the cathode chamber 2c via the air pressure increasing means 4, or via the burner 11b. Since the cathode system inherently has air flowing through it, there is no need to flow oxygen-removed air in the cathode system during shutdown.

The anode off-gas line is a line through which combustible gas containing unutilized hydrogen discharged from the anode chamber flows. In the embodiment of FIG. 4, since the anode off-gas is burned by the burner 11b, the line from the outlet of the anode chamber 2a to the burner 11b is the anode off-gas line. The line in which the hydrogen-containing gas flows during hydrogen production is a line through which a gas essentially containing hydrogen flows during hydrogen production, and is the line from the reformer 11 (reforming reaction tube 11a) to the burner 11b.

Here, an example of switching the line by switching stop valves was described. However, the present invention is not limited to this, and for example a three-way valve may be utilized.

[Second Embodiment of the Fuel Cell System]

Figure 5:
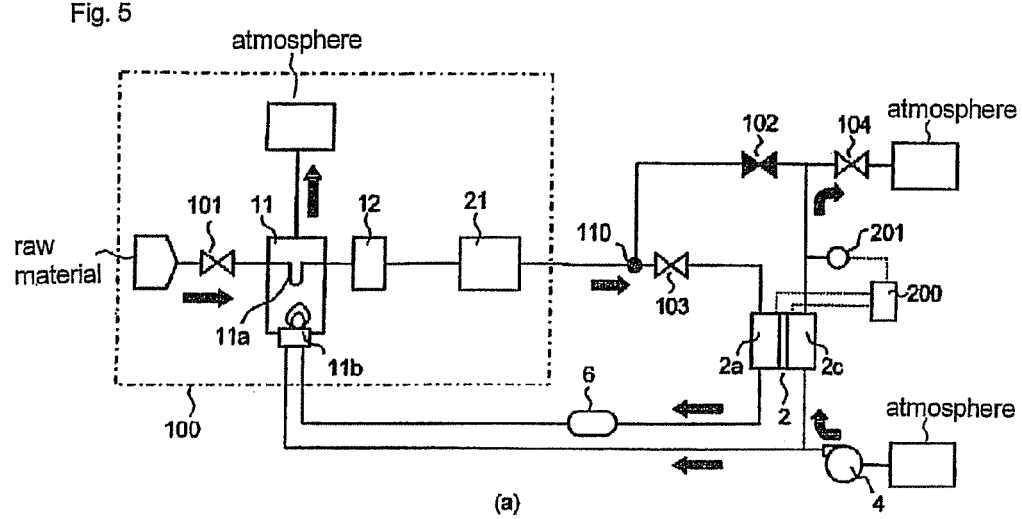
FIG. 5 is a series of flow diagrams illustrating the outline of another embodiment of the fuel cell system according to the present invention.
Figure 5:
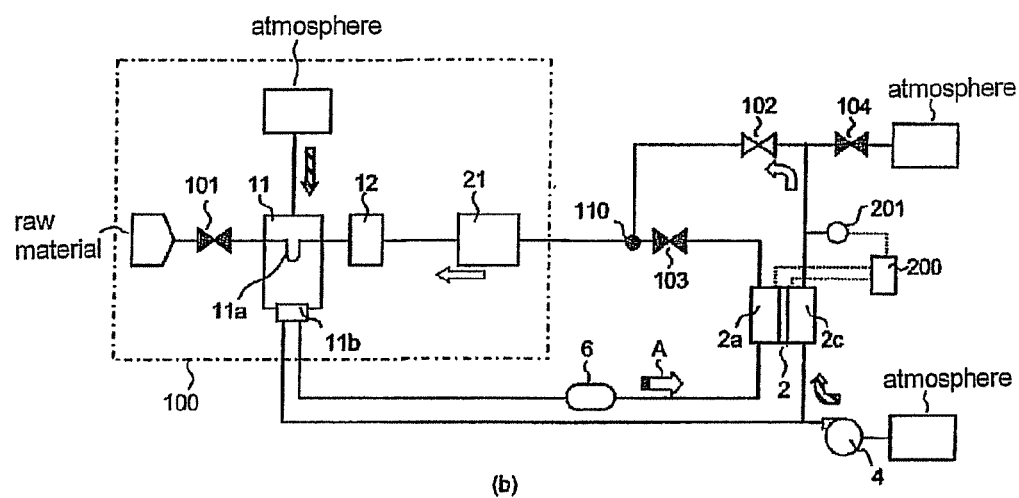

FIG. 5 illustrates another embodiment of the fuel cell system according to the present invention. As illustrated in FIG. 2, the selective oxidation reactor has a structure in which a selective oxidation catalyst bed and an oxygen absorbent bed are stacked in the interior, and the oxygen absorbent bed is arranged on the downstream side. In this embodiment, in addition to removing the oxygen with the oxygen absorbent, oxygen is also removed by the fuel cell. In the embodiment of FIG. 4, the line between the selective oxidation reactor 21 and the valve 103 is branched, and the reformer and the like can be opened to the atmosphere via the valve 102. However, in the embodiment illustrated in FIG. 5, the line between the selective oxidation reactor 21 and the valve 103 is branched, and the reformer and the like can be opened to the atmosphere via the cathode chamber 2c of the fuel cell and the air pressure increasing means 4 in addition to the valve 102. A valve 104 functions along with the valve 102 as a switching means for switching the cathode outlet line used during operation of the fuel cell to the above-described line which opens the reformer and the like to the atmosphere via the cathode chamber.

As illustrated in FIG. 5(a), during operation of the fuel cell system, the anode off-gas is supplied to the burner 11b via a buffer tank 6. The buffer tank is a storage means for storing the hydrogen-containing gas so that hydrogen to be used in power generation by the fuel cell during shutdown is stored. The buffer tank is optional, and in cases such that the capacity of the anode off-gas line is large, the buffer tank may be omitted. The storage means may also be formed with two openings in a vessel capable of being closed to the atmosphere. As a result of the two openings, the storage means can be provided in the anode off gas line.

Further, during operation of the fuel cell system, the cathode outlet gas is open to the atmosphere via the valve 104 (valve 102 is closed).

As illustrated in FIG. 5(b), similarly to the above-described embodiment, upon shutting down the fuel cell, there are carried out steps such as stopping the supply of the substances supplied to the hydrogen production apparatus and shutting off the supply lines thereof, and stopping the supply of the supply substances to the fuel cell system. Further, the valve 102 is opened and the valve 104 is closed, so that the downstream of the selective oxidation reactor 21, that is, the downstream of the oxygen absorbent bed is opened to the atmosphere via the cathode chamber 2c of the fuel cell. Further, by closing the valve 103, a line between the branch point 110 and the anode chamber 2a is shut off. As a result of these operations, as the temperature of the hydrogen production apparatus decreases, air from the atmosphere spontaneously flows to the oxygen absorbent bed via the cathode chamber of the fuel cell. Further, oxygen-removed air spontaneously flows in a direction from the selective oxidation catalyst bed towards the reformer. The line which supplies air to the cathode chamber 2c from the atmosphere by the air pressure increasing means 4 is not shut off, but just the air pressure increasing means is stopped. Although the stopped air pressure increasing means 4 is present between the atmosphere and the cathode chamber 2c, there is a gap in the flow path inside the air pressure increasing means, so that the air pressure increasing means is not completely shut off. Therefore, air can spontaneously flow through the air pressure increasing means.

At this stage, if power is generated by the fuel cell, oxygen in the air which has spontaneously flowed in is consumed by the fuel cell, whereby air from which oxygen has been removed can be obtained. Since this oxygen-removed air flows to the oxygen absorbent bed, the load of the oxygen absorbent is reduced.

At this stage, the oxygen concentration in the air of the cathode chamber outlet may be monitored by an oxygen sensor 201 arranged downstream of the cathode chamber, and the current flowing in the fuel cell may be controlled by a current controller 200 so that the oxygen concentration is not greater than a predetermined value. At the anode chamber side, hydrogen in the hydrogen-containing gas which was present from the valve 103 to the burner 11b is consumed. The anode chamber is open to the atmosphere via the burner 11b, so that as the temperature of the fuel cell etc. decreases, air spontaneously flows in from the atmosphere via the burner. Therefore, if there is a risk that the hydrogen might be insufficient because the capacity from the valve 103 to the anode off-gas line is small, it is preferable to provide a buffer tank 6 in the anode off-gas line to increase the capacity of this portion. That is, the amount of hydrogen required for operation of the fuel cell to remove oxygen is contained in the gas, illustrated by the arrow A, spontaneously flowing to the anode chamber. Further, a buffer tank may be added upstream of the anode (between the valve 103 and the anode chamber 2a).

In the fuel cell system according to the present invention, in cases where the effects of the atmosphere entering the hydrogen production apparatus through diffusion cannot be ignored, such as when the fuel cell system is stopped for a long time, the hydrogen production apparatus may be shut off from the atmosphere by, at the stage where the hydrogen production apparatus has cooled down to about the ambient temperature so that negative pressure due to temperature decrease can be ignored, closing the valve 102 from the state illustrated in FIG. 4(b) or 5(a) for example. Further, in cases where the effects of the atmosphere entering the anode chamber through diffusion cannot be ignored, the anode chamber may also be shut off from the atmosphere by, at the stage where the fuel cell system has cooled down to about the ambient temperature so that negative pressure due to temperature decrease can be ignored, closing the valve provided on the anode off-gas line for example.

In the fuel cell system according to the present invention, the above operations may all be carried out automatically using a control apparatus such as a computer or sequencer for control, and using automatic valves for the valves.

In the fuel cell system according to the present invention, the above operations, specifically, stopping the supply of the supply substances to the fuel cell system, shutting off the line, switching the lines, stopping the air pressure increasing means, starting the operation of the heating means for heating the oxygen absorbent, and starting the oxygen removal operation of the fuel cell, may be carried out simultaneously. Therefore, the shutdown operation is simple. Further, since there is no need to operate a blower for purging after the shutdown, the energy for such device is also unnecessary, thus, there is an energy saving effect. Conventionally, after a shutdown, nitrogen purging was carried out while continuing the combustion of the burner etc. provided in the reformer until a given point of time. However, according to the present invention, combustion with a burner is not necessary after a shutdown, and thus there is an energy saving effect in this point as well.

Even if the oxygen absorbent has to be heated by a heating means such as an electric heater or a dedicated burner after a shutdown, or even if the fuel cell has to be operated to remove the oxygen from the spontaneously flowing air after a shutdown, such an operation is a simple operation on a very limited portion, and the required energy is small.

[Other Devices]

In addition to the above-described devices, well-known components of a hydrogen production apparatus which utilizes a reformer, and well-known components of a fuel cell system may be optionally provided as appropriate. Specific examples include: a steam generator for generating steam to humidify the gases supplied to the fuel cell; a cooling system for cooling various devices such as the fuel cell and the like; pressurizing means such as a pump for pressurizing the various fluids, a compressor, and a blower; flow control means and flow passage shut off/switching means for controlling the flow rate of a fluid or shutting off/switching the flow of a fluid; a heat exchanger for heat exchange/heat recovery; a vaporizer for vaporizing a liquid; a condenser for condensing a gas; heating/keeping-warm means for externally heating the various devices with steam and the like; storage means of the various fluids; an air or electrical system for instrumentation; a signal system for control; a control apparatus; an electrical system for output and required power and the like.

EXAMPLES

Example 1

A hydrogen production apparatus having the configuration illustrated in FIG. 1 was prepared. A copper-zinc catalyst which had been reduced by hydrogen was filled in the shift reactor 12 as a shift catalyst. A reactor having the structure illustrated in FIG. 2 was used for the selective oxidation reactor 21. An oxygen absorbent bed 303 filled with 200 mL (bulk volume) of an oxygen absorbent containing 5 mass % of Ru, 20 mass % of $Y_2O_3$, and a balance of alumina was formed in the selective oxidation reactor as a downstream side packed bed in a vessel 301 which is to be packed with the selective oxidation catalyst. The oxygen absorption capacity of this oxygen absorbent was 5.0 (mL-$O_2$/mL-catalyst).

A selective oxidation catalyst bed 302 filled with 400 mL (bulk volume) of a selective oxidation catalyst supporting 0.35 mass % of Ru as metal mass on an alumina support was formed upstream of the oxygen absorbent bed.

In the vessel 301, a coil-shaped cooling water pipe (nominal diameter of ¼ inch (external diameter of about 14 mm)) 322 was arranged which passed through the selective oxidation catalyst bed and the oxygen absorbent bed. The selective oxidation catalyst bed could be cooled or the like by passing gas-liquid mixed-phase water through the cooling water pipe 322.

This apparatus was repeatedly started up and stopped. After start-up, while hydrogen-containing gas was flowing in the oxygen absorbent bed, the oxygen absorbent bed once generated heat to about 130° C., and then became a steady state at about 100° C. The oxygen absorbent bed was kept in this state for 10 minutes. Then, the apparatus was stopped. At this stage, air from the atmosphere was allowed to spontaneously flow from the downstream side of the selective oxidation reactor as illustrated in FIG. 1(b). It was confirmed that from this operation, 3.5 NL (wherein N means "normal volume") of air flowed through the oxygen absorbent bed as a result of the cooling of the hydrogen production apparatus. The temperature of the shift reaction catalyst provided in the shift reactor 12 was monitored, and no temperature increase at the outlet of the shift catalyst bed accompanied by the inflow of oxygen was observed during the shutdown. Accordingly, it can be said that during the start-up the oxygen absorbent regenerated well, and during the shutdown the oxygen absorbent absorbed oxygen well, so that the flow of oxygen to the shift catalyst bed was suppressed. This start/stop operation was repeated 400 times, and no significant degradation caused by this operation was observed for either the shift catalyst or the selective oxidation catalyst. It was confirmed that the outlet CO concentration and the catalyst bed temperature distribution had both maintained an unchanged state from the beginning. The CO concentration in the selective oxidation reactor outlet gas during hydrogen production was stably 10 ppm by volume.

Comparative Example 1

Instead of a selective oxidation reactor having an oxygen absorbent bed, a selective oxidation reactor which had a selective oxidation catalyst bed but did not have an oxygen absorbent bed was used. Further, a separate oxygen absorption device was provided as a new vessel downstream of the selective oxidation reactor. The oxygen absorption device was provided with the same oxygen absorbent bed as in Example 1 in a vessel. The selective oxidation reactor and the oxygen absorption device were connected by a pipe.

Except for the above, the start-up and shutdown were repeated in the same manner as in Example 1. After the start-up, while the hydrogen-containing gas was flowing in the oxygen absorbent bed, the oxygen absorbent bed was about 50° C., and did not reach a temperature higher than that. After keeping the oxygen absorbent bed in this state for 10 minutes, the same operations as in Example 1 were carried out, and then the apparatus was stopped. The amount of air suctioned during the shutdown was the same as in Example 1, 3.5 NL. However, during the shutdown, the thermocouple temperature monitoring the shift catalyst bed temperature increased by about 50° C. When a start/stop test operation was performed 400 times in the same manner as in Example 1 using this apparatus configuration, a change gradually appeared in the shift catalyst bed temperature from after 150 times. From about the 250th time, the CO concentration at the outlet of the selective oxidation reactor 21 was no longer 10 ppm or less.

Comparative Example 2

Instead of the oxygen absorbent used in Example 1, a reactor packed with a commercially-available copper-zinc catalyst (manufactured by Süd-Chemie Catalysts Japan, Inc., model name: MDC-1) reduced by hydrogen was used. The oxygen absorption capacity of this catalyst was 14.0. The rest of the configuration was the same as in Example 1.

When the starting and stopping were repeated in the same manner as in Example 1, the amount of air suctioned during the shutdown of the apparatus was the same as in Example 1, 3.5 NL. During the first-time shutdown, the copper-zinc catalyst packed downstream of the selective oxidation catalyst bed generated heat, and heat generated from oxidation by the oxygen in the suctioned air was confirmed. An increase in the temperature of the shift catalyst bed at this stage was not observed. However, this experiment was repeated, and after the 5th shutdown, heat was not generated anymore from the copper-zinc catalyst arranged downstream of the selective oxidation catalyst as a result of the air suction, rather, heat generated from the shift catalyst bed was observed. The oxygen absorption capacity of the copper-zinc catalyst arranged downstream of the selective oxidation catalyst bed was 0.8, whereby it was learned that the oxygen absorption capacity of this catalyst had not been regenerated.

When a start/stop test operation was performed 400 times in the same manner as in Example 1 using this apparatus configuration, a change gradually appeared in the shift catalyst bed temperature from after 30 times. From about the 80th time, the CO concentration at the outlet of the selective oxidation reactor 21 was no longer 10 ppm or less.

INDUSTRIAL APPLICABILITY

The hydrogen production apparatus according to the present invention may be utilized for the production of a hydrogen-containing gas to serve as a fuel for a fuel cell, and may further be utilized by a hydrogen station and the like for supplying a hydrogen-containing gas to an automobile.

The fuel cell system according to the present invention may be used in a power generation apparatus for moving vehicles such as an automobile, fixed power generation systems, cogeneration systems and the like.

The invention claimed is:

1. A hydrogen production apparatus comprising a reforming part for obtaining a hydrogen-containing gas by utilizing a reforming reaction from a raw material for hydrogen production, a shift reaction part for reducing the concentration of carbon monoxide in the outlet gas of the reforming part by shift reaction, and a selective oxidation reaction part having a selective oxidation catalyst bed packed with a selective oxidation catalyst which selectively oxidizes carbon monoxide for further reducing the concentration of carbon monoxide in the outlet gas of the shift reaction part, wherein the hydrogen production apparatus comprises an oxygen absorbent bed packed with an oxygen absorbent capable of absorbing oxygen and capable of being regenerated at 80° C. or more and 150° C. or less by a reducing gas, and the oxygen absorbent bed and the selective oxidation catalyst bed are stacked in a single reactor vessel with the oxygen absorbent bed on the downstream side with respect to the flow of the hydrogen-containing gas, the hydrogen production apparatus comprises means for opening the downstream of the oxygen absorbent bed to the atmosphere, the hydrogen production apparatus comprises a cooling system for cooling the oxygen absorbent bed to 80° C. or more and 150° C. or less;

wherein the cooling system comprises a channel flowing a cooling medium through the reactor vessel holding the oxygen absorbent;

and wherein the channel passes through the selective oxidation catalyst bed and the oxygen absorbent bed.

2. The hydrogen production apparatus according to claim 1, wherein the oxygen absorbent contains at least one metal selected from the group consisting of Ru, Pt, Au, Ni, Co, Rh, Pd, Ir, Ag and Re.

3. The hydrogen production apparatus according to claim 2, wherein the oxygen absorbent contains at least one oxide selected from ceria, zirconia, titania, yttria, manganese oxide, tin oxide, iron oxide, copper oxide and zinc oxide.

4. The hydrogen production apparatus according to claim 1, wherein the oxygen absorbent contains at least one oxide selected from ceria, zirconia, titania, yttria, manganese oxide, tin oxide, iron oxide, copper oxide and zinc oxide.

5. The hydrogen production apparatus according to claim 1, wherein the oxygen absorbent bed and the selective oxidation catalyst bed thermally contact with each other.

6. A fuel cell system comprising a hydrogen production apparatus including a reforming part for obtaining a hydrogen-containing gas by utilizing a reforming reaction from a raw material for hydrogen production, a shift reaction part for reducing the concentration of carbon monoxide in the outlet gas of the reforming part by shift reaction, and a selective oxidation reaction part having a selective oxidation catalyst bed packed with a selective oxidation catalyst which selectively oxidizes carbon monoxide for further reducing the concentration of carbon monoxide in the outlet gas of the shift reaction part; and a fuel cell which generates electric power using the gas obtained from the hydrogen production apparatus, wherein the fuel cell system comprises an oxygen absorbent bed packed with an oxygen absorbent capable of absorbing oxygen and capable of being regenerated at 80° C. or more and 150° C. or less by a reducing gas, and the oxygen absorbent bed and the selective oxidation catalyst bed are stacked in a single reactor vessel with the oxygen absorbent bed on the downstream side with respect to the flow of the hydrogen-containing gas, the fuel cell system comprises means for opening the downstream of the oxygen absorbent bed to the atmosphere, the fuel cell system comprises a cooling system for cooling the oxygen absorbent bed to 80° C. or more and 150° C. or less;

wherein the cooling system comprises a channel flowing a cooling medium through the reactor vessel holding the oxygen absorbent;

and wherein the channel passes through the selective oxidation catalyst bed and the oxygen absorbent bed.

7. The hydrogen production apparatus according to claim 1, wherein the cooling system comprises a water pipe.

8. The hydrogen production apparatus according to claim 1, wherein an oxygen absorption capacity of the oxygen absorbent is 5 or more and 10 or less, where the oxygen absorption capacity is defined as a normal volume of oxygen which can be absorbed per unit volume of the oxygen absorbent.

9. The fuel cell system according to claim 6, wherein the oxygen absorbent bed and the selective oxidation catalyst bed thermally contact with each other.

10. The fuel cell system according to claim 6, wherein the cooling system comprises a water pipe.

11. The fuel cell system according to claim 6, wherein an oxygen absorption capacity of the oxygen absorbent is 5 or more and 10 or less, where the oxygen absorption capacity is defined as a normal volume of oxygen which can be absorbed per unit volume of the oxygen absorbent.

12. A method for operating a fuel cell system comprising a hydrogen production apparatus including a reforming part for obtaining a hydrogen-containing gas by utilizing a reforming reaction from a raw material for hydrogen production, a shift reaction part for reducing the concentration of carbon monoxide in the outlet gas of the reforming part by shift reaction, and a selective oxidation reaction part having a selective oxidation catalyst bed packed with a selective oxidation catalyst which selectively oxidizes carbon monoxide for further reducing the concentration of carbon monoxide in the outlet gas of the shift reaction part; and a fuel cell which generates electric power using the gas obtained from the hydrogen production apparatus, wherein the fuel cell system comprises an oxygen absorbent bed packed with an oxygen absorbent capable of absorbing oxygen and capable of being regenerated at 80° C. or more and 150° C. or less by a reducing gas, and the oxygen absorbent bed and the selective oxidation catalyst bed are stacked in a single reactor vessel with the oxygen absorbent bed on the downstream side with respect to the flow of the hydrogen-containing gas, the fuel cell system comprises means for opening the downstream of the oxygen absorbent bed to the atmosphere, the fuel cell system comprises a cooling system for cooling the oxygen absorbent bed to 80° C. or more and 150° C. or less; and wherein the cooling system comprises a channel flowing a cooling medium through the reactor vessel holding the oxygen absorbent, the method comprising:

opening the downstream of the oxygen absorbent bed to the atmosphere upon shutting down the fuel cell system;

regenerating the oxygen absorbent using the hydrogen-containing gas when hydrogen is produced by the hydrogen production apparatus;

and removing heat generated at the selective oxidation catalyst bed and providing the removed heat to the oxygen absorbent by the channel during hydrogen production.

* * * * *